United States Patent Office 3,006,963
Patented Oct. 31, 1961

3,006,963
PRODUCTION OF SULFOXIDES AND SULFONES
Saul R. Buc, Harlan B. Freyermuth, and Herman S. Schultz, all of Easton, Pa., assignors to General Aniline & Film Corporation, New York, N.Y., a corporation of Delaware
No Drawing. Filed Dec. 22, 1959, Ser. No. 861,217
20 Claims. (Cl. 260—607)

This invention relates to a method for producing sulfoxide- and sulfone-containing compounds, and more particularly to a process for the oxidation of organic compounds containing a sulfide linkage with hydrogen peroxide.

A number of oxidizing agents have been previously proposed and employed for the oxidation of organic sulfides to the corresponding sulfoxides and sulfones, including chlorine, sodium hypochlorite, sodium chlorate in HCl, and hydrogen peroxide alone or in glacial acetic acid, etc. Such processes have in general been plagued with a number of problems and disadvantages, including unduly long reaction times, unduly high reaction temperatures, unduly low yields, deterioration of the organic sulfide, contamination of the desired product by the by-products of oxidation, undue loss of oxidizing agent during the reaction due to decomposition, and undue dependence upon critical conditions of pH and the like.

It is an object of this invention to provide a process for oxidizing an organic sulfide compound to the corresponding sulfoxide and/or sulfone compound which will not be subject to the above disadvantages. Another object of this invention is the provision of a process for producing sulfoxide- and sulfone-containing compounds by reaction of a compound containing at least one divalent sulfur atom bonded to two carbon atoms with hydrogen peroxide which will not be subject to the above disadvantages. Still another object of this invention is the provision of an improved process for producing sulfone-containing compounds by reaction of a compound containing at least one divalent sulfoxide group bonded to two carbon atoms with hydrogen peroxide. Other objects and advantages will appear as the description proceeds.

The attainment of the above objects is made possible by this invention which is based upon the discovery that tungstic acids and their alkali metal, alkaline earth metal, ammonium and amine salts constitute a group of highly effective catalysts for the oxidation of organic sulfides to the corresponding sulfoxides and/or sulfones and the oxidation of organic sulfoxides to the corresponding sulfones. The use of any of such tungstic acid compounds to catalyze the oxidation of organic sulfides and sulfones has been unexpectedly found to enable the attainment of several advantages and improved results with respect to shortened reaction time, lower reaction temperatures, increased yields, decreased deterioration of the compound being oxidized, decreased dependence upon conditions of pH, and/or decreased loss of hydrogen peroxide due to decomposition and the like.

The invention accordingly comprises a process for producing sulfoxide- and sulfone-containing compounds comprising reacting one mole of a compound containing at least one divalent sulfur atom bonded to two carbon atoms with from 1 to 2 moles of hydrogen peroxide for each such sulfur atom in said compound, in the presence of a catalytic amount of a member of the group consisting of the tungstic acids and their alkali metal, alkaline earth metal, ammonium and amine salts.

The invention further comprises a process for producing sulfone-containing compounds comprising reacting one mole of a compound containing at least one divalent sulfoxide group bonded to two carbon atoms with one mole of hydrogen peroxide for each such group in said compound, in the presence of a catalytic amount of a member of the group consisting of the tungstic acids and their alkali metal, alkaline earth metal, ammonium and amine salts.

As stated above, any organic compound containing at least one divalent sulfur atom or divalent sulfoxide group joined to two carbon atoms may be treated in accordance with the process of the present invention. Broadly speaking, such compounds may be described as thioethers or compounds containing a heterocyclic ring including a divalent sulfur atom bonded to two carbon atoms in the ring. Accordingly, thioethers may be defined as having the structure R—S—R', and the hetero—S— containing compounds as having the same structure but in which R and R' represent, when joined together, the atoms necessary to form a cycle. As indicated, the sulfur atom in these compounds must be joined to a carbon atom in the R and R' moieties.

As representative of compounds containing a divalent sulfur atom as part of a heterocycle, there may be mentioned, tetrahydrothiazine, thioxanthene, thioxanthone, tetrahydrothiophene derivatives and the like. The heterocyclic groups in these compounds may contain any organic or inorganic substituents and may be fused to any number of carbocyclic or heterocyclic rings which may be further substituted. As suitable substituents, there may be mentioned by way of example only, such groups as hydroxy, alkoxy, nitro, halo, alkyl, aryl, carboxyl, amido, acyloxy, sulfonic, sulfoxy, sulfone, sulfonamide, nitrile, acyl and the like, in addition to inorganic groups including metals, etc.

As the organic sulfides or thioethers which may be oxidized in accordance with the present process, any compound of the above formula may be employed in which R and R' are organic radicals and are joined to the divalent sulfur atom through a carbon atom. The organic radical R or R' may be the same or different and may be aliphatic, aromatic, or heterocyclic, as for example radicals of heterocyclic compounds described in the preceding paragraph. R and R' may be alkyl, such as methyl and stearyl, aryl such as phenyl, naphthyl, anthraquinonyl, anthronyl, benzanthronyl, azine, azole, quinolinyl, pyridyl, pyrrol, thioxanthene, thioxanthone, thiophene, xanthene, xanthone, furane, and any other known moiety joined to the divalent sulfur atom through a carbon atom. Further, such R or R' moiety may be the monovalent radical, joined to the divalent sulfur atom through a carbon atom, of any known dyestuff or other functional agent. Further, R and R' may contain any desired organic or inorganic substituent or substituents of the type illustratively described above, and/or may be fused to any desired number of carbocyclic or heterocyclic rings.

It will be understood that the process of this invention is applicable for the oxidation to the sulfone stage of any of the sulfoxides corresponding to the above described compounds containing at least one divalent sulfur atom bonded to two carbon atoms.

In carrying out the reaction, it is preferred to employ an aqueous medium although in some instances a water miscible organic solvent for the starting intermediate may be employed as the reaction medium or as a mutual solvent in the aqueous medium for solubilizing purposes. As examples of such solvents, there may be mentioned methanol, ethanol, butanol, Cellosolves (lower alkyl and benzyl ethers of ethylene glycol), Carbitols (lower alkyl ethers of diethylene glycol), dioxane, acetone, methyl ethyl ketone, and the like. The reaction may be carried out at any temperature ranging from the freezing point to the boiling point of the medium although elevated temperatures of about 50° to 80° or 90° C. are preferred in most instances to accelerate the reaction. It is one of the advantages of this process that it may be carried out at lower temperatures than required in the absence of the present catalysts and that even at the same temperatures, much shorter reaction times are made possible whereby deterioration of starting intermediate, oxidizing agent and the like is minimized.

The hydrogen peroxide in the amount theoretically required to produce the sulfoxide or sulfone from the sulfide, or the sulfone from the sulfoxide, may be added at the start of the reaction or may be added gradually as the reaction proceeds. Starting with the sulfide, the reaction proceeds in two stages, in the first of which the sulfide is oxidized to the sulfoxide and in the second of which the sulfoxide is oxidized to the sulfone. The first stage of the reaction proceeds readily and is exothermic in nature whereby the temperature of the reaction medium rises without introduction of heat, in some instances to the boiling point. Cooling is often required to prevent the temperature from rising to a point detrimental to the reaction or to the chemical structure of the intermediate and final compound. The reaction medium may be homogeneous or heterogeneous, and in the form of a solution, dispersion or emulsion. The sulfoxide derivative is usually more soluble in water than either the sulfide or sulfone so that in many cases the sulfoxide is in solution in aqueous medium during the oxidation with hydrogen peroxide and may be isolated by cooling the aqueous solution or salting and/or extracting with appropriate solvents and/or separating layers and/or filtering off solid products.

One molecule of hydrogen peroxide theoretically is required to oxidize each said divalent sulfur atom in the starting compound to the corresponding sulfoxide, and another molecule of hydrogen peroxide required to oxidize the sulfoxide group to the sulfone. It is another advantage of this process that only substantially theoretical proportions are needed, although an excess of the hydrogen peroxide may be employed if so desired. This is made possible by the accelerated rate of reaction and/or lowered reaction temperatures necessary in the present process. For similar reasons, the reaction medium may be maintained at any desired pH ranging for example from about 1 to 10 or 11 and preferably 6 to 7, even though alkaline conditions are normally detrimental to the stability of the hydrogen peroxide.

The oxidation of the sulfoxide to the sulfone is generally more difficult than the oxidation of the sulfide to the sulfoxide and may require more elevated temperatures and/or longer reaction times. In any case, the reaction to either the sulfoxide or the sulfone stage may be followed by testing for unreacted hydrogen peroxide with starch-iodide paper as the reaction proceeds. A negative testing indicates an absence of unreacted hydrogen peroxide indicating the reaction to be completed if the theoretical amount of hydrogen peroxide has been employed.

The hydrogen peroxide is preferably added in the form of the commercially available 30 to 31% aqueous solution although it may be added in any other form, e.g. from 5 to 100% concentration. To minimize loss due to decomposition of the hydrogen peroxide it is in some instances preferred to maintain the pH of the reaction medium in the neutral or acid range and/or to add the hydrogen peroxide at a rate about equal to its rate of consumption in the reaction. It will be understood that the process may be carried out by batch, intermittent or continuous methods. Any excess of hydrogen peroxide remaining after completion of the reaction may be removed by a brief reflux or by addition of a small, equivalent amount of sodium bisulfite.

The catalyst employed in the present process is a tungstic acid or a salt thereof, neutral or acid. Tungstic acid or sodium tungstate are preferred, but any other tungstic acid or alkali metal, alkaline earth metal, ammonium or amine salt thereof may be employed. For example, the corresponding homopolytungstic and heteropolytungstic acids and their salts may be employed, as for example, those of borotungstic acid, phosphotungstic acid, bismotungstic acid, selenotungstic acid, molybdotungstic acid, and the like. Salts of any of these tungstic acids with sodium, potassium, lithium, calcium, barium, magnesium, ammonium, mono-, di-, and tri-ethanol-, -propanol-, -methyl-, -ethyl-, and -propyl-amines, cyclohexylamine, morpholine, pyridine, picoline and the like may be employed. The catalyst may also be formed in the reaction medium by addition of tungstic oxide. The catalytic amount of such tungstic acid compounds required to achieve the desired results will in any particular instance be readily ascertainable by the person skilled in the art operating the process. In general, such amounts may range from about 0.001% to 10% by weight of the compound being oxidized, although amounts outside this range may be operative. Generally, 0.1 to 1% of the catalyst will be sufficient.

The mechanism by which the unexpectedly improved results of this process are obtained is not clearly understood although it is postulated, without of course being limited thereto, that the oxidation is actually effectuated by the action of the peroxyacid of the highest oxidation state of the tungstic acid which is continuously regenerated by the hydrogen peroxide.

As a further feature of this invention it has been found that further improved results are obtainable by inclusion in the reaction medium of a small amount of sequestering agent, for example from about 0.001 to 5% in the medium. This further improvement is based upon the discovery that small and even trace amounts of copper, chromium, iron and certain other metals catalyze the decomposition of hydrogen peroxide and/or other side reactions detrimental to the progress of the desired reaction. Such detrimental effects of these metal impurities is much more pronounced when the oxidations are carried out over an extended period of time such as 10 to 24 hours and/or at higher temperatures in the absence of the present catalytic substances. Although the use of these catalysts minimizes such undesirable decomposition and side reactions, optimum results in commercial use may in some instances be obtained by the addition of such sequestering agent. Ethylenediamine tetraacetic acid and other aminopolycarboxylic, and polyaminopolycarboxylic acids and their salts, preferably the alkali metal (sodium, potassium) salts, are preferred for use herein. However, these and other known sequestering agents for such metals may be used such as $\beta$-hydroxyethyl ethylene diamine triacetic acid, triethanolamine, citric acid, bis-N($\beta$-hydroxyethyl) glycine, gluconic acid, tartaric acid. The usefulness of the improved process of this invention for carrying out oxidation of sulfide- and sulfoxide-containing organic compounds has been pointed out above. It will be understood that the products of such oxidation processes are suitable for a number of different known uses. In general, the sulfoxide and sulfone derivatives obtained by the present process are useful in a variety of applications such as dyestuff intermediates, dyestuffs, textile finishes, ultraviolet absorbers, photographic or photosensitive intermediates, water repellents, antibiotic substances, pharmaceuticals, polymer intermediates (monomers), and the like. By way of example, the process of this invention may be employed as a step in the production of compounds containing a sulfatoethylsulfone group as disclosed in U.S. 2,670,265. Such compounds are reactive with fibrous materials acting to impart to the fibrous material any desired effect depending on the structure of the compound containing the sulfatoethylsulfone group. In this manner, improvements may be obtained in dyeing, crease-proofing, moth-proofing, immunizing, water-proofing or water-repellentizing, etc.

The following examples are only illustrative of the instant invention and are not to be regarded as limitative.

All parts and proportions referred to herein and in the appended claims are by weight unless otherwise indicated.

*Example 1*

0.2 part tungstic acid (WO₃.H₂O) is slurried with 75 parts water and the pH raised to 11.6 by the addition of 50% sodium hydroxide solution. After about five minutes stirring, the pH is lowered to 6 by the dropwise addition of glacial acetic acid. 31.7 parts of 5-nitro-2-methyl-m-xylylene-α¹,α³-bis(mercaptoethanol) are added to the catalyst solution and the mixture heated to 60–65° C. 21.9 parts 31% hydrogen peroxide are added gradually over a one-half hour period. The temperature is maintained at 60–65° C. by cooling with a cold water bath. The suspension of bis-sulfide goes into solution as it is oxidized to the bis-sulfoxide, and at the end of the addition of peroxide a homogeneous system exists. After five minutes stirring the reaction mixture gives a negative hydrogen peroxide test on starch-potassium iodide paper. The temperature of the reaction mixture is raised to 65–70° C. and 24.1 parts 31% hydrogen peroxide are gradually added during a one-half hour period and the temperature maintained at 70–75° C. by cooling. During the addition of the second portion of peroxide, the bis-sulfone is formed and percipitates out. The reaction mixture is refluxed for one-half hour, then cooled to room temperature. The product is filtered, washed with water and dried in a vacuum oven at 85° C. 36.6 g. of pure 5-nitro-2-methyl-m-xylylene-α¹,α³-bis(sulfonylethanol), melting at 193–194° C. are obtained. This corresponds to a 96% yield. The product has the following structure:

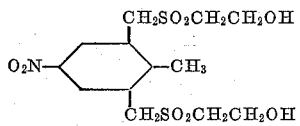

The bis-mercaptoethanol intermediate subjected to oxidation in this example is prepared by bis-chlormethylation of p-nitrotoluene and reaction of the bis-chloromethylated compound with mercaptoethanol.

*Example 2*

(For comparison, without catalyst)

31.7 parts 5-nitro-2-methyl-m-xylylene-α¹,α³-bis-(mercaptoethanol)=0.10 moles are added to 75 parts of water of pH 6.0 and the mixture heated to 60° C. There is then added in 32 minutes, 20.6 parts per volume of 30% hydrogen peroxide. After 13.5 parts per volume have been added the mixture represents a clear solution. The solution is heated to reflux and there is then added in 10 minutes, 23.2 parts per volume of 30% hydrogen peroxide. The solution becomes lighter. A positive test for hydrogen peroxide stays after 3 hours at reflux. Let cool and stand overnight. Flter and wash with a little ice water. Yield=21.60 g. dry product=56.6% of theory, M.P.=168–170° C. The product has the same structure as that of Example 1.

*Example 3*

65 parts tetrasodium ethylene diamine tetraacetate solution (0.0375 g./ml.) and 1.2 parts tungstic acid are slurried in 420 parts distilled water and the pH raised to 11.6 by the addition of 50% sodium hydroxide solution. After five minutes stirring the pH is lowered to 6.0 by the addition of glacial acetic acid. 148 parts 2-(5-nitro-o-xylyl-a¹-mercapto)ethanol are added to the catalyst solution and the mixture heated to 60–65° C. 75.34 parts 31% hydrogen peroxide are added over a one-half hour period. The temperature is maintained at 70–75° C. during the addition of the second portion of hydrogen peroxide. The reaction mixture is then refluxed for 10 minutes and cooled to room temperature. The product is filtered, washed with ice water and air dried. 165 parts of 2-(5-nitro-o-xylyl-a¹-sulfonyl) ethanol are obtained melting at 143–146° C. The yield is 97.5%. The product has the following structure:

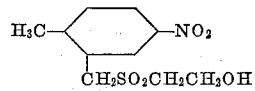

The mercaptoethanol intermediate subjected to oxidation in this example is prepared by monochloromethylation of p-nitrotoluene and reaction of the chloromethylated compound with mercaptoethanol.

*Example 4*

The procedure of Example 1 is repeated except that 10 parts tetrasodium ethylenediamine tetraacetate solution (.0375 g./ml.) and 24.3 parts 2-(2-nitro-o-anisyl-α¹-mercapto) ethanol are added to the catalyst solution instead of the bis-(mercaptoethanol). The product has a melting point of 130–132° C. obtained in 90.0% yield. Its structure is

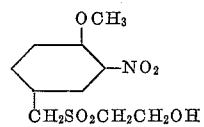

*Example 5*

The procedure of Example 1 is repeated except that 10 parts tetrasodium ethylenediamine tetraacetate solution (.0375 g./ml.) and 24.3 parts 2-(4-nitro-o-anisyl-α¹-mercapto) ethanol are added to the catalyst solution instead of the bis(mercaptoethanol). The product has the structure

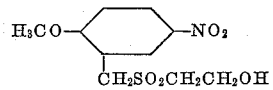

*Example 6*

0.66 part tungstic acid is slurried with 216 parts distilled water and the pH raised to 11.5 by the addition of 50% sodium hydroxide solution. After stirring five minutes the pH is lowered to 6.0 by the addition of glacial acetic acid. 122 parts of thiodiglycol are added to the catalyst solution and the mixture heated to 60–65° C. 109 parts 31% hydrogen peroxide are added over a one-half hour period. The temperature is maintained at 60–65° C. by cooling with a cold water bath. A negative test for hydrogen peroxide on starch-potassium iodide paper is obtained. At this point the sulfoxide has been formed. 109 parts 31% hydrogen peroxide, the amount required to oxidize to the sulfone, are added over a one-half hour period, the temperature being maintained at 70–75° C. during the addition. A positive test for hydrogen peroxide is obtained on starch iodide paper. After 20 minutes a negative test for hydrogen peroxide is obtained. 5 parts 31% hydrogen peroxide are added and the temperature maintained at 70–75° C. for one hour longer. A very slight positive test for hydrogen peroxide is obtained on starch iodide paper. The reaction is considered completed. The volume of finished reaction mixture is 543 ml. The structure of the product is (diethanolsulfone)

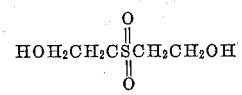

*Example 7*

(For comparison, without catalyst)

36.6 parts thiodiglycol are added to 75 parts distilled water and the solution heated to 90–95° C. 32.8 parts (one-half required amount) of 31% hydrogen peroxide are added over a one-half hour period at the same temperature. A negative test for hydrogen peroxide on starch-potassium iodide paper is obtained. Upon adding 11.16 parts of the second half of hydrogen peroxide, a strong positive test for hydrogen peroxide is obtained on starch iodide paper. The reaction does not use up 34% of the required amount of the second portion of hydrogen peroxide in the time required to complete a catalyzed reaction as in Example 6.

Example 8

The oxidation 2,2',4,4' - tetrahydroxydiphenylsulfide (resorcylsulfide) proceeds much more rapidly with tungstic acid catalyst than in the absence of catalyst. 25 parts 2,2',4,4' - tetrahydroxydiphenylsulfide, 75 parts water and 0.2 part tungstic acid are treated at pH 6 with 10.9 parts 31% hydrogen peroxide at 60–65° C. by gradual addition of the peroxide during one-half hour in a manner similar to the first stage of the oxidation step of Example 1. The 2,2',4,4'-tetrahydroxydiphenylsulfoxide which separates out melts at 168–170° C.

Example 9

0.2 part of tungstic acid is suspended in 75 parts water and the pH raised to 11.6 by the addition of a 50% caustic soda solution while stirring. 10 parts of an aqueous solution containing 0.375 part tetrasodium ethylenediamine tetraacetate is added and the pH adjusted to 6 by the addition of acetic acid. 18.6 parts diphenylsulfide and 75 parts dioxane are then added. The temperature is raised to 60–65° C. and 11 parts of 31% hydrogen peroxide are added gradually with stirring. After the oxidation to sulfoxide is completed, the temperature is raised to reflux (90–91° C.) and 19.1 parts 31% hydrogen peroxide are added and the mixture refluxed for 10 hours. The reaction mixture is diluted with 200 parts water and cooled to room temperature. The product is filtered, washed with water, and dried. 20.44 parts of white diphenylsulfone are obtained, melting at 123–125° C.

Example 10

A catalyst solution is prepared by dissolving 0.2 g. (0.0008 moles) tungstic acid in 65 cc. distilled water by taking pH to 11.3 using a 50% sodium hydroxide solution. A few drops of glacial acetic acid are then added to bring pH back to 5.6 and to give a slightly translucent solution. This solution is charged to a reactor with 30.8 grams (0.2 moles) of 2-phenylmercaptoethanol.

The rapidly stirred heterogeneous solution is heated to 63° C., heat removed and 31% hydrogen peroxide dripped in form a burette. An immediate large exotherm results requiring cooling with a water bath. The solution becomes clear and homogeneous when 16.8 cc. have been added. 199 cc. (approximating the amount of hydrogen peroxide needed to oxidize to the sulfoxide state) are added to a negative starch-iodide test in 29 minutes with the temperature kept at 63–67° C. by cooling. A total of 35 cc. hydrogen peroxide is dripped in until a negative starch-iodide stage is reached in a total of 1 hour, 3 minutes. The exotherm is not as great after the sulfoxide stage although some cooling is needed. The temperature in the second stage is 70–75° C. Hydrogen peroxide is added slowly after this point to a total of 41 cc. in an effort to achieve stoichiometry using the starch-iodide reaction as a guide. This takes one hour and five minutes longer; and slight warming to maintain temperature is needed at the end. One cc. hydrogen peroxide gives a positive test for the last 15 minutes. The theoretical amount of $H_2O_2$ is estimated at 40 cc. The pH of the final solution is 4.4. The trace of peroxide present is removed by adding a pinch of sodium bisulfite. The salted solution is extracted several times with benzene, the benzene dried and stripped and the product then distilled through a simple take-off head. The 2-phenylsulfonylethanol product is obtained in 94½% yield, B.P. 184° C. at 4 mm., $n_D^{24}$ 1.5555. The structure is confirmed by infrared spectra and analysis.

*Analysis.*—C, 52.04%; H, 5.57%; S, 77.22%. Theoretical: C, 51.8%; H, 5.4%; S, 17.21%.

Example 11

This example discloses the oxidation of 2-phenylmercapto ethanol to mainly 2-phenylsulfinylethanol when no catalyst is used under conditions similar to those of Example 10.

The same amount of 2-phenylmercaptoethanol as in Example 10 in 65 cc. distilled water is charged to a stirred reactor and the reactor heated to 65° C. No obvious heat requiring cooling is given off on addition of hydrogen peroxide. Heating is required to maintain a temperature range of 65–70° C. 70 minutes are required to give a clear homogeneous solution after the addition of a total of 19 cc. 31% hydrogen peroxide in several portions during this period. This is approximately the correct amount for the sulfide to sulfoxide stage. Within 15 minutes of the clearing point, a total of 39 cc. hydrogen peroxide has been added. A temperature of 71–75° C. is maintained by heating from this point for a total reaction time of 4 hours 40 minutes. The pH of the clear solution at the end is 4. 0.17 mole sodium bisulfite are needed to make the solution negative to starch-iodide paper. The amount of hydrogen peroxide estimated over that needed to give the sulfoxide is 0.19 mole. The reaction product is worked as Example 10. Fractions distilling at 179–207° C., at 1 to 4 mm. and $n_D^{25}$ 1.5809–1.5848 are shown to be the same by infrared spectra and to contain neither the sulfide nor sulfone groups. This product is the 2-phenylsulfinylethanol in 63½% yield.

*Analysis.*—C, 56.42; H, 6.01; S, 19.91. Theoretical for sulfoxide C, 56.6; H, 5.88; S, 18.84.

A small amount of a higher boiling material is also obtained which is not a sulfone.

Example 12

This example discloses the oxidation of 2-phenylsulfinylethanol to 2-phenylsulfonylethanol by hydrogen peroxide using tungstic acid solution as a catalyst.

A catalyst solution is prepared as in Example 10 0.2 mole 2-phenylsulfinylethanol is charged with the catalyst solution to a stirred reaction vessel and the reactor temperature raised to 70° C. 20 cc. 31% hydrogen peroxide are dripped into the stirred reactor in the course of 35 minutes with intermittent cooling to maintain temperature in the 70–75° C. range. A negative starch-iodide test is obtained in 5 minutes more. Another cc. of $H_2O_2$ is added and heat maintained for 15 minutes longer by slight warming. The reaction is worked up in the same way as in Example 10 to give a 95% yield of 2-phenylsulfonylethanol.

Example 13

2 parts of tungstic acid are slurried with 1000 parts water and 16 parts of 10% sodium hydroxide solution are added gradually until pH 11.5 is reached. 178 parts 3,3'-thiodipropionic acid are dissolved in the catalyst solution and the mixture heated to 60° C. At 60° C., 219 parts of 31% hydrogen peroxide are added gradually during 2½ hours. After the oxidation is complete, the reaction mixture gives a slight positive test for hydrogen peroxide on potassium starch-iodide paper. A white solid precipitates during the last half of peroxide addition. The reaction mixture is cooled to room temperature. The white solid is filtered and dried in an electric oven at 80° C. 192.2 parts of 3,3'-sulfonyldipropionic acid (91.3% yield) are obtained melting at 222–224° C. The pH during the oxidation is approximately 3.

This invention has been disclosed with respect to certain preferred embodiments and various modifications and variations thereof will become obvious to persons skilled in the art. It is to be understood that such modifications and variations are to be included within the spirit and scope of this invention.

We claim:

1. In a process for producing sulfoxide- and sulfone-containing compounds comprising reacting one mole of a compound containing at least one divalent sulfur atom bonded to two carbon atoms with from 1 to 2 moles of hydrogen peroxide for each such sulfur atom in said compound, the improvement comprising carrying out the reaction in the presence of a catalytic amount of a member of the group consisting of the tungstic acids and their alkali metal, alkaline earth metal, ammonium and amine salts.

2. A process as defined in claim 1 carried out at a temperature of about 50 to 80° C.

3. A process a defined in claim 1 wherein a catalytic amount of sodium tungstate is employed.

4. A process as defined in claim 1 wherein a catalytic amount of tungstic acid is employed.

5. A process as defined in claim 1 carried out in the presence of a sequestering agent.

6. A process as defined in claim 5 wherein the sequestering agent is sodium ethylenediamine tetraacetate.

7. In a process for producing sulfone-containing compounds comprising reacting one mole of a compound containing at least one divalent sulfoxide group bonded to 2 carbon atoms with one mole of hydrogen peroxide for each such group in said compound, the improvement comprising carrying out the reaction in the presence of a catalytic amount of a member of the group consisting of the tungstic acids and their alkali metal, alkaline earth metal, ammonium and amine salts.

8. A process as defined in claim 7 carried out at a temperature of about 50 to 80° C.

9. A process as defined in claim 7 wherein a catalytic amount of sodium tungstate is employed.

10. A process as defined in claim 7 wherein a catalytic amount of tungstic acid is employed.

11. A process as defined in claim 7 carried out in the presence of a sequestering agent.

12. A process as defined in claim 11 wherein the sequestering agent is sodium ethylenediamine tetraacetate.

13. A process for producing 5-nitro-2-methyl-m-xylylene-$\alpha^1,\alpha^3$-bis(2-sulfonylethanol) comprising reacting one mole 5-nitro-2-methyl-m-xylylene-$\alpha^1,\alpha^3$-bis(2 - mercaptoethanol) with 4 moles of hydrogen peroxide in the presence of a catalytic amount of a member of the group consisting of the tungstic acids and their alkali metal, alkaline earth metal, ammonium and amine salts.

14. A process as defined in claim 13 carried out in the presence of a sequestering agent.

15. A process for producing diethanolsulfone comprising reacting one mole of thiodiglycol with two moles of hydrogen peroxide in the presence of a catalytic amount of a member of the group consisting of the tungstic acids and their alkali metal, alkaline earth metal, ammonium and amine salts.

16. A process as defined in claim 15 carried out in the presence of a sequestering agent.

17. A process for producing 2-phenylsulfonyl ethanol comprising reacting one mole of 2-phenylmercapto ethanol with 2 moles of hydrogen peroxide in the presence of a catalytic amount of a member of the group consisting of the tungstic acids and their alkali metal, alkaline earth metal, ammonium and amine salts.

18. A process for producing 3,3'-sulfonyldipropionic acid comprising reacting one mole of 3,3'-thiodipropionic acid with two moles of hydrogen peroxide in the presence of a catalytic amount of a member of the group consisting of the tungstic acids and their alkali metal, alkaline earth metal, ammonium and amine salts.

19. A process for producing 2-(5-nitro-o-xylyl-$\alpha^1$-sulfonyl) ethanol comprising reacting one mole of 2-(5-nitro-o-xylyl-$\alpha^1$-mercapto) with two moles of hydrogen peroxide in the presence of a catalytic amount of a member of the group consisting of the tungstic acids and their alkali metal, alkaline earth metal, ammonium and amine salts.

20. A process for producing diphenylsulfone comprising reacting one mole of diphenylsulfide with two moles of hydrogen peroxide in the presence of a catalytic amount of a member of the group consisting of the tungstic acids and their alkali metal, alkaline earth metal, ammonium and amine salts.

No references cited.